Jan. 14, 1941.  S. SHAFER, JR  2,228,852
GRIT WASHER AND SEPARATOR
Filed Aug. 25, 1937  3 Sheets-Sheet 1

Inventor
Samuel Shafer, Jr.,
By Barker & Collins
Attorneys

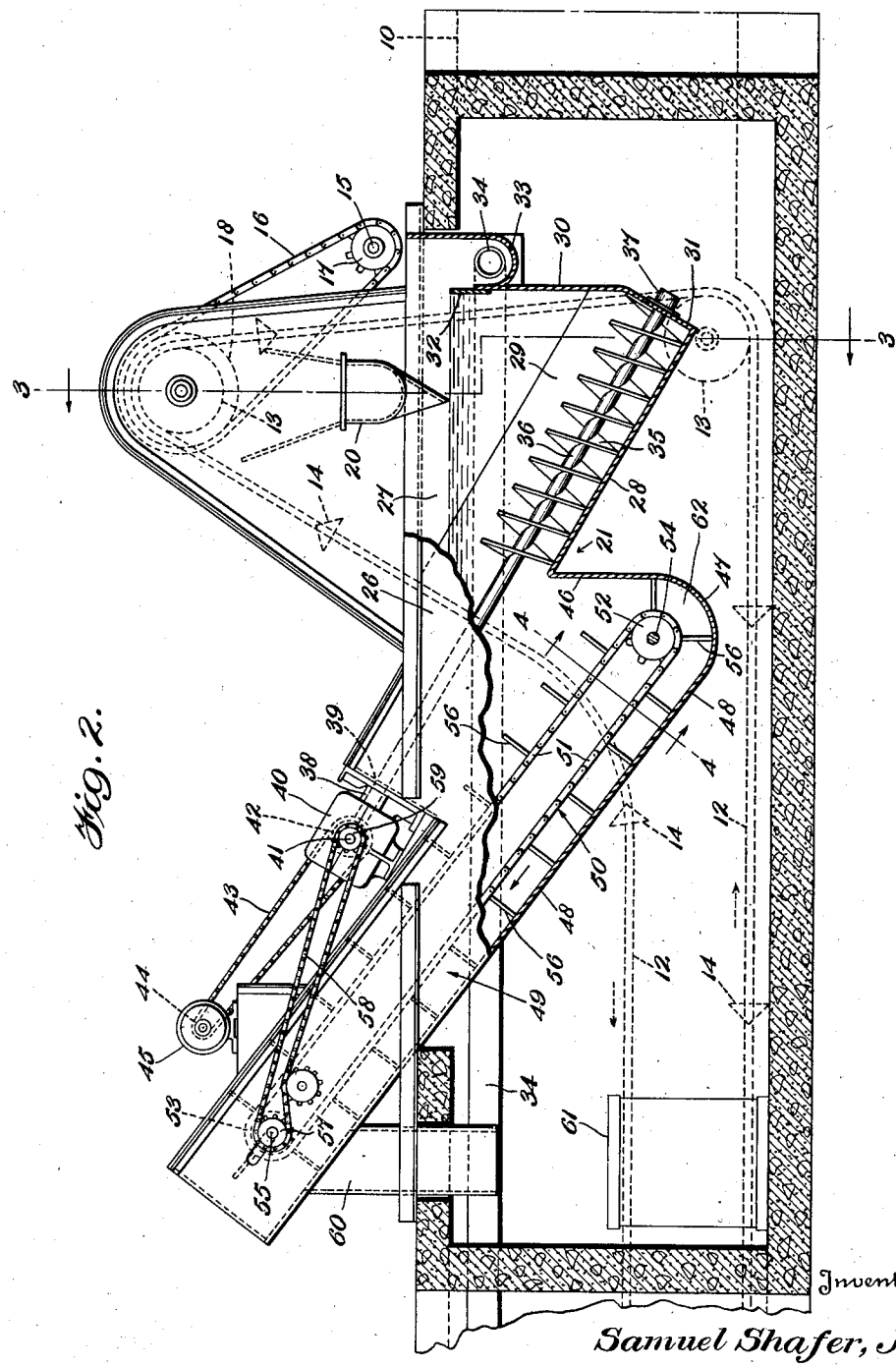

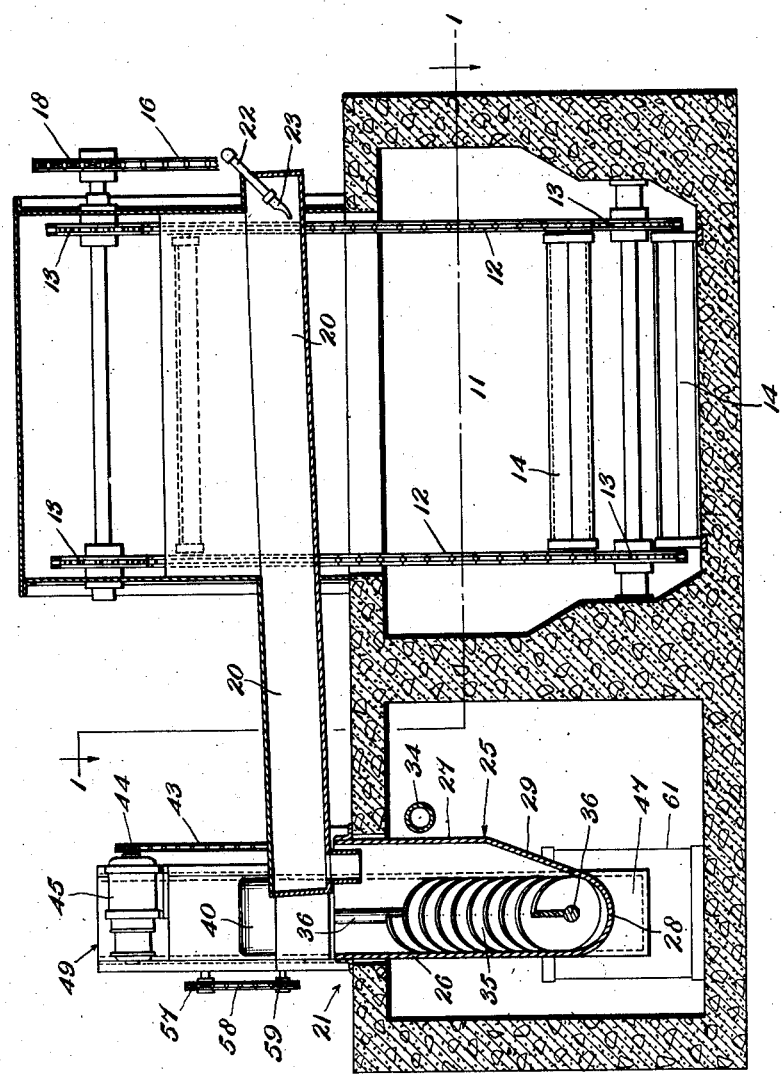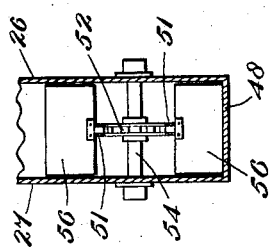

Patented Jan. 14, 1941

2,228,852

UNITED STATES PATENT OFFICE 2,228,852

GRIT WASHER AND SEPARATOR

Samuel Shafer, Jr., Milwaukee, Wis., assignor to Chain Belt Company, Milwaukee, Wis., a corporation of Wisconsin Application August 25, 1937, Serial No. 160,909

7 Claims. (Cl. 210—3)

The invention relates to the purification and clarification of sewage and other mixtures of liquid, organic and inorganic or "grit" solids, and more especially to separating the inorganics from such a mixture and washing them to remove intermingled and adhering organics.

In the treatment of sewage and other liquids carrying organic and inorganic solids for the purification of such liquids by the accepted practice of sedimentation, it is customary to flow the mixtures through sedimentation basins or zones at low velocities which permit the solids to settle out of the liquid. Present practice is to promote sedimentation in at least two stages or zones, in the first of which the liquid flows at sufficient velocity to maintain the major portion of the organic solids in suspension, while permitting substantially all of the inorganic or mineral solids to settle. Sedimentation of the organics is thereafter accomplished at lower velocities in a subsequent zone.

Although control of the flow velocity in the first zone in accordance with the solids density of the liquid has been attempted, it has been found practically impossible to so regulate such velocity as to prevent a relatively large amount of organic solids from settling along with the grit, thus making necessary a washing or elutriation operation to rid the inorganics of entrained putrescible organic solids, and render the grit suitable for final disposal.

Primarily the present invention resides in a method and apparatus for effecting or furthering the removal of substantially organics-free grit from liquids bearing organic and inorganic solids, whereby improved purification of the grit is accomplished outside the sedimentation zone and in a manner conducive to the recovery of grit sufficiently free from deleterious and putrescible organics as to make it suitable for road gravel, filter beds, land filling and like uses.

One of the principal objects of the invention is to provide a degree and type of agitation and washing which promotes to a high degree the separation of grit from the putrescible organics contained in sewage and like solids-bearing liquids.

A further object of the invention is to provide an arrangement of agitating and washing means which produce maximum scouring actions which to a great extent free the grit of putrescible organics, and thereafter transfer said grit into a zone of semi-quiescence for a further and more gentle agitative effect, and in which, through a rolling or turn-over action during its removal from the washing zone, the grit is even more completely freed from liquid, colloidal, and other putrescible organics. Such semi-quiescent zone is furthermore conducive to the settling of those very fine and smaller particles of grit which heretofore have remained in suspension in the liquid and were carried back into the parent stream, there to give trouble in the further purification treatment and separation of the organics from the liquid.

With the above and other objects in view which will appear as the description proceeds, the invention consists in the novel details of construction, and combinations and arrangements of parts, more fully hereinafter set forth and particularly pointed out in the appended claims.

Referring to the accompanying drawings forming a part of this specification, in which like reference characters designate like parts in all the views—

Fig. 2 is a longitudinal sectional view, partly in elevation, through the grit washer and separator, taken approximately on the planes indicated by the line 2—2 of Fig. 1, looking in the direction of the arrows:

Fig. 3 is a transverse sectional view, taken approximately on the planes indicated by the line 3—3 of Fig. 2, looking in the direction of the arrows; and Fig. 4 is a detail cross sectional view, taken on the plane indicated by the line 4—4 of Fig. 2.

Figure 1:
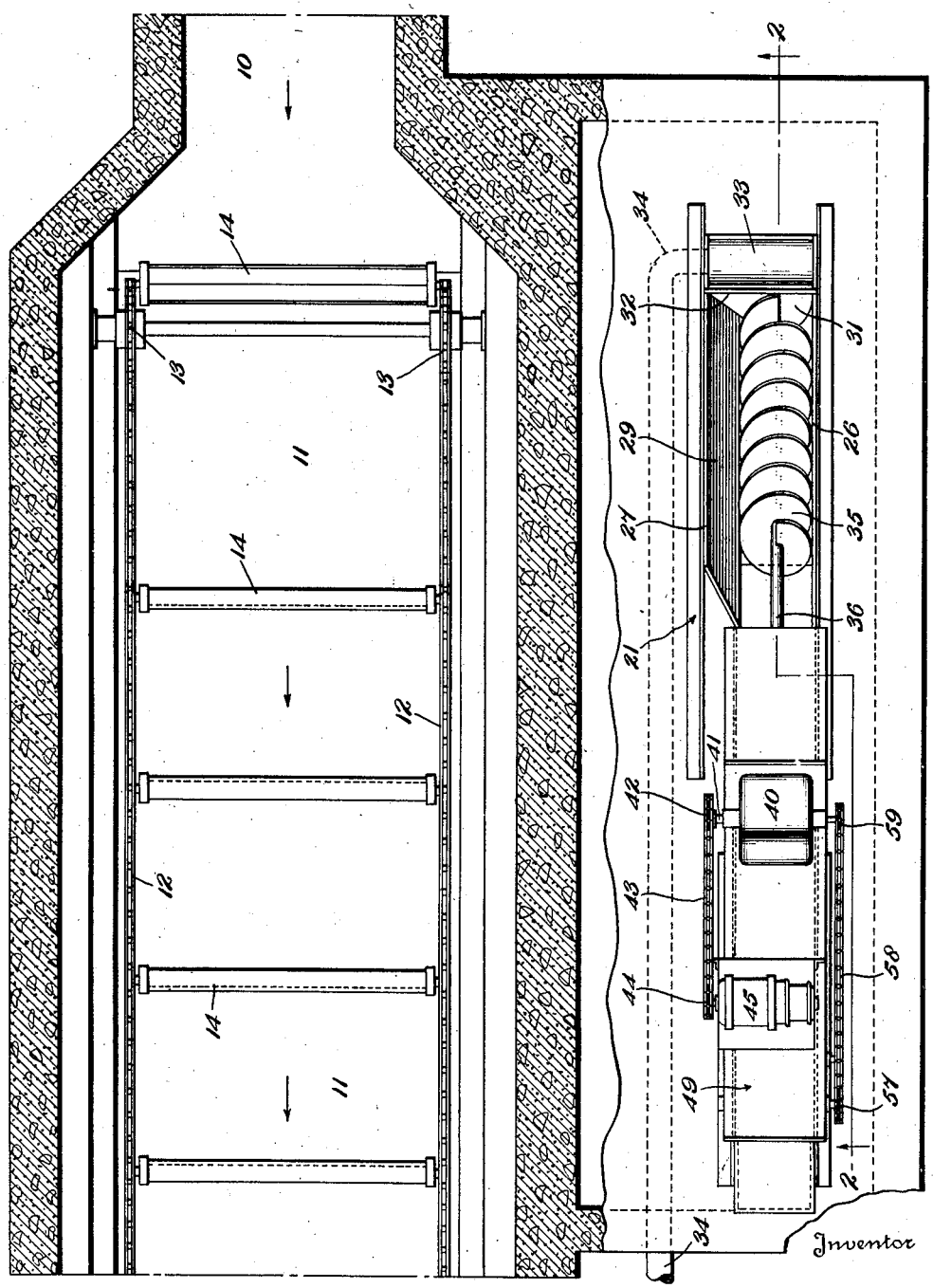
Figure 1 is a sectional plan view, taken approximately on the planes indicated by the line 1—1 of Fig. 3, illustrating a portion of a typical sewage settling chamber provided with mechanical sludge removing mechanism, and having associated with it one form of grit washer and separator constructed in accordance with the present invention.

In the said drawings, 10 indicates a channel or conduit through which the solids-bearing liquid may flow in the direction indicated by the arrows into a settling chamber 11, provided with a sludge collecting conveyer and elevator comprising spaced endless chains 12 passing around sprockets 13 and supporting the V-shaped buckets 14. The said conveyer may be driven from a power shaft 15 by a chain 16 and sprockets 17 and 18, as shown in Figs. 2 and 3. The buckets 14 pass slowly over the floor of the chamber 11, in a direction opposite to that of the liquid current therein, to collect the sludge or solids settled on said floor, and after passing the lower sprockets 13, elevate them out of the chamber. As the buckets pass around the upper sprockets 13 they deposit their contents, comprising intermingled organic and inorganic solids, into a transversely extending trough 20, which conducts them to the grit washer and separator 21, positioned to one side and out of the chamber 11. A pipe 22 provided with one or more spray nozzles 23 is arranged to introduce clean water into the trough 20 to aid in the transfer, and assist in washing the grit and separating the organics therefrom.

The apparatus thus far described is of substantially the type disclosed in the prior co-pending application of Robert T. Steindorf, filed August 12, 1936, Serial No. 95,665, Sedimentation apparatus, now Patent No. 2,136,400, granted November 15, 1938.

The grit washer comprises a receptacle 25, here shown as constructed of metal, having the vertical side walls 26 and 27, the former of which, at the right hand end as viewed in Fig. 2, merges into a transversely curved longitudinally inclined bottom wall 28, which in turn merges into a transversely inclined side wall 29, connecting with the vertical side wall 27, see Fig. 3. The said receptacle is also provided with an end wall 30, the lower portion 31 of which is disposed at substantially a right angle to the inclination of the bottom wall 28, and the upper portion of which is provided with a vertically adjustable weir 32, adapted to govern the height of the liquid level in the receptacle. An outlet trough 33 is provided adjacent the weir 32, for receiving the liquid and organics which flow over the said weir, and a pipe or conduit 34 communicates therewith to conduct such overflow back to the channel 10 beyond the settling basin 11, or to such other point as may be desired.

Mounted in the receptacle 25 with its axis parallel to the longitudinally inclined bottom wall 28, is a screw 35, the shaft 36 of which is journalled in suitable bearings 37 and 38, associated respectively with the end walls 31 and 39, see Fig. 2. The upper end of said shaft extends into a gear box 40 containing suitable bevel or other gearing whereby the shaft 36 may be driven from a transverse shaft 41 journalled in said gear box and having at one end a sprocket 42, about which passes a chain 43, extending to and engaging a sprocket 44 associated with and driven by any suitable power unit 45. The screw 35 is preferably of such length as not to extend above the surface of the liquid in the receptacle 25, as determined by the weir 32; and the inclined bottom wall 28 terminates just short of the upper end of the screw, where it meets a transverse vertical wall 46. This wall extends downwardly to provide a step or pocket, and is curved as at 47 to join a longitudinally inclined wall 48, constituting the bottom of an extension 49 of the receptacle 25, the side walls 26 and 27 of which are also extended to form with the bottom wall 48 a trough-like housing for a conveyer 50, comprising an endless chain 51 carrying suitably spaced flights or scrapers 56. The said chain passes around sprockets 52 and 53 carried by shafts 54 and 55 respectively, journalled in bearings mounted on said side walls 26 and 27, and the shaft 55 carries a sprocket 57 engaged by a chain 58 which also engages a sprocket 59 mounted on the other end of the shaft 41 of the gear mechanism 40. The conveyer housing 49 is provided at its upper end with a downwardly extending discharge conduit or chute 60 through which the washed grit may be deposited into a suitable receptacle 61 placed below it.

In operation, the mixed organics and inorganics, after being collected from the floor of the settling chamber 11 by the sludge remover buckets 14, are elevated thereby and deposited in the trough 20, through which they are flowed by the clean water from the nozzle 23, into the receptacle 25 above the screw 35. There is an intermittent feed of sludge to the washer as each bucket 14 deposits its contents into the trough 20, and a continuous feed of clean water from pipe 22 through the spray nozzle 23, which dislodges some of the organics from the grit as it passes along the said trough. As is well known to those skilled in the art, the organics have a specific gravity only slightly greater than that of water, which causes them to tend to remain in suspension and settle only slowly. Upon deposit into receptacle 25 the organics which are now in suspension will flow with the liquid over the weir 32 into trough 33 from whence they are discharged through conduit 34.

The grit, being heavier, and such organics as are not freed therefrom, will fall upon the screw 35, which is rotated at a fairly rapid rate, and by the agitation and attrition produced by its convolutions, in conjunction with the walls of the receptacle, a scouring action is attained which in the presence of the relatively large quantity of clear water furnished by pipe 22, dislodges substantially all of the organics from the grit, passing them into suspension and causing them to be carried over the weir 32 to the pipe 34. The screw 35 is rotated in such direction as to cause its convolutions to move the grit upwardly along the bottom wall 28, and discharge it into the pocket 62 formed by walls 26, 27, 46, 47 and 48. In falling into this pocket which contains relatively quiescent liquid, there is a further tendency to separate the grit and any remaining organics, so that the grit picked up by the flights 56 of conveyer 50 is relatively clean.

Since the screw 35 preferably does not extend above the surface of the liqiud, the zone of turbulence or agitation set up in the liquid by its rotation is pretty well confined to the right hand end of the receptacle 25, as viewed in Fig. 2, while the left hand end of the receptacle including the pocket 62 provides a relatively quiescent zone in which, as above stated, the finer grit particles which heretofore have remained in suspension will tend to settle. The flight conveyer 50, which operates in this semi-quiescent zone, preferably at a somewhat lower rate of speed than screw 35, emerges the grit from the liquid at a point well removed from the zone of turbulence, and in so doing rolls it over and over up the inclined bottom wall 48, thereby freeing it from substantially the last trace of putrescible organics. Since the current induced by the overflow at weir 32 is constantly tending to draw the organics in a direction away from the point of grit emergence, there is a minimum of likelihood of organics being carried up by conveyer 50 and discharged with the grit into receptacle 61. The efficiency of the apparatus is therefore relatively high, and as previously stated, grit recovered through its use is sufficiently clean to be used without further treatment for filter beds, road gravel, land filling, and the like.

While one form of the invention has been illustrated and described, it is obvious that those skilled in the art may vary the precise details of construction and arrangements of parts constituting the apparatus, and the precise steps and combinations thereof constituting the method, without departing from the spirit of the invention, and therefore it is not wished to be limited to the above disclosure except as may be required by the claims.

What is claimed is:

1. Elutriating apparatus for freeing the inorganic grit content of sewage sludge from entrained or adhering putrescible organics and recovering the cleansed grit, comprising a liquid-sludge receiving receptacle having a plurality of upwardly inclined imperforate bottom surfaces verticaly offset one from the other to form a pocket intermediate the ends of said receptacle providing a zone in which relatively quiescent sedimentation of the inorganics may take place; means for introducing the sludge containing the inorganics and entrained or adhering putrescible organics into said receptacle; means adjacent one of said inclined bottom surfaces for actively agitating the sludge materials settling on said surface in a comparatively localized zone which is in unobstructed communication with said quiescent settling zone; to scour and free the grit from the entrained or adhering organics and suspend the latter in the liquid, said means also moving the cleansed grit into the relatively quiescent settling zone; means adjacent the other inclined bottom surface for removing the scoured grit settling in said quiescent zone to a point above the level of the liquid in the receptacle; and means remote from the zone of emergence of the cleansed grit from the liquid for conducting the liquid-suspended organics from the receptacle.

2. Elutriating apparatus for freeing the inorganic grit content of sewage sludge from entrained or adhering putrescible organics and recovering the cleansed grit, comprising a liquid-sludge receiving receptacle having a plurality of upwardly inclined imperforate bottom surfaces serially arranged and vertically offset one from the other to form a pocket intermediate the ends of the receptacle providing a zone in which relatively quiescent sedimentation of the inorganics may take place; means for introducing the sludge containing the inorganic grit and the entrained or adhering putrescible organics into said receptacle above one of said surfaces at substantially the level of the liquid therein; agitating and conveying means adjacent said surface for actively agitating and scouring the sludge materials settling on said surface in a comparatively localized zone which is in unobstructed communication with said quiescent settling zone, to free the grit from at least the major portion of the entrained or adhering organics and to suspend the latter in the liquid, said means also moving the grit up said inclined surface and into the relatively quiescent settling zone; means adjacent the other inclined bottom surface for moving the grit settling in said quiescent zone up said surface to a point above the level of the liquid in the receptacle, said last named means subjecting the grit during such removal to a relatively gentle attritive action tending to free any remaining organics therefrom without resuspending the grit in the liquid; and means remote from the zone of emergence of the cleansed grit from the liquid for conducting the liquid-suspended organics from the receptacle.

3. Elutriating apparatus for freeing the inorganic grit content of sewage sludge from entrained or adhering putrescible organics and recovering the cleansed grit, comprising a liquid-sludge receiving receptacle having a plurality of serial upwardly inclined imperforate bottom surfaces vertically offset one from the other and interconnected to form a pocket intermediate the ends of the receptacle in which relatively quiescent sedimentation of the inorganics may take place; means for introducing the sludge containing the inorganic grit and the entrained or adhering putrescible organics into said receptacle at substantially the level of the liquid therein; upwardly inclined agitating and conveying means adjacent one of said bottom surfaces for relatively actively agitating and scouring the sludge materials settling on said surface in a comparatively localized zone which is in unobstructed communication with the relatively quiescent settling zone in said pocket, to free the grit from at least the major portion of the entrained or adhering organics and to suspend the latter in the liquid, said means also moving the grit up said inclined surface and into the quiescent settling zone in the pocket; means adjacent the other inclined bottom surface for subjecting the grit settling in said quiescent zone to a relatively gentle attritive action to free any remaining organics while moving said grit up said surface to a point above the level of the liquid in the receptacle; and means including a liquid outlet from said receptacle for maintaining the liquid therein at a level completely submerging said inclined agitating and conveying means, whereby a body of liquid is provided directly above the upper terminal portion of said agitating and conveying means through which the organics may rise without obstruction to the surface of the liquid.

4. Elutriating apparatus according to claim 1, wherein the agitating and conveying means for actively agitating and scouring the sludge materials comprises an axially inclined screw conveyer having means for rotating it at a comparatively rapid rate.

5. Elutriating apparatus according to claim 2, wherein the agitating and conveying means for actively agitating and scouring the sludge materials comprises an axially inclined screw conveyer having means for rotating it at a comparatively rapid rate, and the means for emerging the grit from the quiescent settling zone and subjecting it to a gentle attritive action comprises a flight conveyer having a run moving upwardly along the complementary inclined bottom surface, and means for driving such flight conveyer at a relatively low speed.

6. The method of treating sewage sludge to separate the inorganic from the organic solids contained therein, which comprises producing a localized zone of agitation in an otherwise relatively quiescent body of liquid; introducing the sludge into said zone and subjecting it to agitation therein to separate at least the major portion of the organics from the inorganics and cause the former to become suspended in said liquid; removing the inorganics from said agitation zone into the relatively quiescent portion of the liquid; emerging said inorganics from said quiescent portion at a point removed from said agitation zone; and withdrawing the liquid and suspended organics.

7. The method of treating sewage sludge to separate the inorganic from the organic solids contained therein, which comprises producing a localized zone of agitation in an otherwise relatively quiescent body of liquid; introducing the sludge into said zone and subjecting it to a relatively violent agitating and scouring action therein sufficient to separate at least the major portion of the organics from the inorganics and cause the former to become suspended in said liquid; removing the inorganics from said agitation zone and causing them to drop by gravity through a relatively quiescent portion of the liquid, whereby a further separation of organics therefrom may be obtained; then subjecting said inorganics to a further relatively gentle agitation to separate any remaining organics, while emerging said inorganics from said quiescent liquid at a point removed from said agitation zone; and withdrawing the liquid and suspended organics at a point adjacent said agitation zone.

SAMUEL SHAFER, Jr.